United States Patent [19]

Hamasaki

[11] Patent Number: 5,131,025
[45] Date of Patent: Jul. 14, 1992

[54] INTELLIGENT MODEM SYSTEM WHICH DETERMINES PROPER ACCESS THERETO

[75] Inventor: Hideyasu Hamasaki, Kawaguchi, Japan

[73] Assignee: Omron Tateisi Electronics Co., Kyoto, Japan

[21] Appl. No.: 561,253

[22] Filed: Jul. 30, 1990

Related U.S. Application Data

[63] Continuation of Ser. No. 275,127, Nov. 22, 1988, abandoned.

[30] Foreign Application Priority Data

Nov. 25, 1987 [JP] Japan .................................. 62-297102

[51] Int. Cl.$^5$ ........................................ H04M 11/00
[52] U.S. Cl. ........................................ 379/95; 380/25; 375/8
[58] Field of Search ................ 379/95, 97, 98; 380/23, 380/25; 375/8; 340/825.52

[56] References Cited

U.S. PATENT DOCUMENTS

| | | | |
|---|---|---|---|
| 3,984,637 | 10/1976 | Caudill et al. | 379/95 |
| 4,246,442 | 1/1981 | Hashimoto | 379/95 |
| 4,310,720 | 1/1982 | Check, Jr. | 379/95 |
| 4,430,728 | 2/1984 | Beitel et al. | 379/95 |
| 4,484,307 | 11/1984 | Kulczyckyj et al. | 379/95 |
| 4,520,233 | 5/1985 | Smith | 379/95 |
| 4,546,213 | 10/1985 | Dick | 379/95 |
| 4,596,021 | 6/1986 | Carter et al. | 379/98 |
| 4,601,011 | 7/1986 | Grynberg | 379/95 |
| 4,604,499 | 8/1986 | Hughes | 379/95 |
| 4,626,623 | 12/1986 | Lahaye | 379/95 |
| 4,679,226 | 7/1987 | Muehleisen | 379/95 |
| 4,685,124 | 8/1987 | Smitt et al. | 379/95 |
| 4,782,498 | 11/1988 | Copeland, III | 375/8 |
| 4,831,648 | 5/1989 | Nishino | 379/95 |
| 4,905,281 | 2/1990 | Surjaatmadja et al. | 379/95 |

Primary Examiner—James L. Dwyer
Assistant Examiner—Wing F. Chan
Attorney, Agent, or Firm—Dickstein, Shapiro & Morin

[57] ABSTRACT

An intelligent modem system which is used for connecting an information processing terminal such as a microcomputer with a public communication line by modulating and demodulating the data transmitted between the information processing terminal and the public communication line, comprising: an information set up circuit which can set up at least ID information; and a reception operation control circuit which verifies if an incoming call is from an authorized party or not by responding to the public communication line according to the ID information, and connects a modem circuit connected to the public communication line to a line leading to the information processing terminal only when an incoming call is confirmed to be from an authorized party. Thereby, the information processing terminal connected to the modem system may not be equipped with an arrangement to identify the other parties of communication whereby the cost for software for the information processing terminal may be reduced, and, when an attempt is made by an unauthorized party to get access to the modem system, the information processing terminal may continue the execution of the current jobs without being disrupted by any such unauthorized incoming calls.

14 Claims, 9 Drawing Sheets

FIG. 10

| S<sub>Y</sub> | D<sub>Y</sub> | S<sub>X</sub> | INFORMATION FIELD | E<sub>X</sub> | D<sub>L</sub> | E<sub>X</sub> | BC<sub>C</sub> | F<sub>F</sub> | S<sub>Y</sub> |

FIG. 11

| SIGNAL | |
|---|---|
| INQ | INFORMATION FIELD |
| IAN | VERSION NUMBER |
| ID | VERSION NUMBER |
| ACK | COMMAND CHARACTER + ID NUMBER |
| | $A_K$ |

INTELLIGENT MODEM SYSTEM WHICH DETERMINES PROPER ACCESS THERETO

This application is a continuation, of application Ser. No. 07/275 127, filed Nov. 22, 1988, now abandoned.

TECHNICAL FIELD

The present invention relates to an intelligent modem system which offers improved security against unauthorized attempts to get access to the system.

BACKGROUND OF THE INVENTION

Generally, data communication should be permitted only between authorized parties, and it is highly desirable to eliminate any possibility of unauthorized tapping of data from the system and sabotaging of the system by such unauthorized access to the system. Therefore, for some time, it has been customary to require an acknowledgment before data communication can be started between any two parties. However, conventional modem systems were not equipped with any such means of acknowledging the other parties of communication, and the computer software for data communication typically included routines for acknowledging the other parties of communication. Therefore, communication software has tended to be more complex than otherwise, and the users had to bear the cost for this added complexity of the communication software.

Furthermore, since the conventional modem systems were not provided with any means for identifying the other parties of communication, every time data was transmitted to each modem system, the mother computer of this modem system had to interrupt the current job by an escape sequence and carry out the acknowledgment sequence to find out if the data was sent from an authorized party or not. Therefore, if the incoming data was transmitted simply by mistake or for sabotaging purpose, a considerable time loss would be incurred to the receiver of this unauthorized data transmission as a result of interrupting the current job, executing an escape sequence, and recovering the status of the system.

For instance, in the case of an electronic bulletin board system, if the bulletin board system responded to every attempt of access, the system would be so overburdened by erroneous and other unauthorized attempts to get access to the system that the authorized users of the bulletin board service would have a great difficulty in receiving the service.

BRIEF SUMMARY OF THE INVENTION

In view of such problems of conventional modem systems, a primary object of the present invention is to provide an intelligent modem system which eliminates the need for the information processing terminal connected to the modem system to be equipped with means to identify the other party.

A second object of the present invention is to provide an intelligent modem system which can prevent the operation of the information processing terminal connected to the modem system from being disrupted by attempts by unauthorized parties to get access to the modem system.

A third object of the present invention is to provide an intelligent modem system which can positively foil any attempts by unauthorized parties to get access to the modem system.

These and other objects of the present invention can be accomplished by providing a intelligent modem system which is to be connected between an information processing terminal such as a micro computer and a public communication line to modulate and demodulate data transmitted between the information processing terminal and the public communication line, comprising: information set up means which can set up at least ID information; and reception operation control means which verifies if an incoming call is from an authorized party or not by responding to the public communication line according to the ID information, and connects a modem circuit connected to the public communication line to a line leading to the information processing terminal only when an incoming call is confirmed to be from an authorized party.

Thus, the information processing terminal, typically consisting of a microcomputer, connected to the modem system, may not be equipped with means to identify the other parties of communication whereby the cost for software for the information processing terminal may be reduced. Further, if an attempt is made by an unauthorized party to get access to the modem system, since the sequence for identifying the other party is carried out by the modem system itself, and the information processing terminal may continue the execution of the current jobs without being disrupted by any such unauthorized incoming calls.

According to a preferred embodiment of the present invention, this modem system may further comprise: (1) transmission operation control means which introduces itself to the other party by responding to the public communication line according to the ID information, and connects a modem circuit connected to the public communication line to a line leading to the information processing terminal upon permission of communication from the other party; (2) means to inquire if the other party is equipped with means to identify the other party or not, the self introduction being performed only when the modem system of the other party is equipped with the means to identify the other party; and/or (3) means to disconnect the modem system from the public communication line when the other party is not an authorized party.

According to another aspect of the present invention, the reception operation control means is provided with the functions of: a) sending out a carrier to the other party after connection of the system to the public communication line in response to reception of a call from the other party; b) receiving ID information transmitted from the other party; c) comparing the received ID information and internal ID information; d) starting a continuous transmission of data to the other party when the receive ID information agrees with the internal ID information; e) connecting the modem circuit connected with the public communication line to a line leading to the information processing terminal in synchronism with an interruption of a continuous transmission of data from the other party; and f) notifying the completion of the connection of the modem circuit with the information processing terminal to the information processing terminal; and the transmission operation control means is provided with the functions of: a) waiting for a transmission of a carrier from the other party after connection of the system to the public communication line for data transmission; b) transmitting a carrier and ID information upon reception of the carrier transmitted from the other party; c) starting a continuous transmission of data upon reception of a continuous transmission of data from the other party; d) discontinuing the continuous transmission of data, and connecting a modem circuit connected to the public communication line to a line leading to the information processing terminal; and e) notifying completion of the connection of the modem circuit with the information processing terminal to the information processing terminal.

According to yet another aspect of the present invention, the information set up means is adapted for setting up operation mode designating information as well as ID information, and the modem system is provided with an operation mode which corresponds to the operation mode designating information.

The operation mode designating information may designate: (1) whether the other party is required to be identified or not before connecting the modem circuit connected to the public communication line to a line leading to the information processing terminal; (2) whether self introduction is to be made or not before connecting the modem circuit connected to the public communication line to a line leading to the information processing terminal; (3) a telephone communication mode based on the use of a telephone set without designating a data communication mode based on the use of the information processing terminal immediately after the other party is identified to be an authorized party; (4) a transition to a telephone communication mode based on the use of a telephone set immediately after conclusion of data transmission with the information processing terminal; (5) a transition to a remote maintenance mode without designating a data communication mode based on the use of the information processing terminal immediately after the other party is identified to be an authorized party; or (6) a remote control mode without designating a data communication mode based on the use of the information processing terminal immediately after the other party is identified to be an authorized party.

According to yet another aspect of the present invention, the operation mode designating information causes the self introduction operation only upon occurrence of a transmission operation in association with setting up of the operation mode designating information, but causes the information processing terminal to be connected to the modem circuit without the self introduction operation for a normal transmission operation, and the verification of the ID information is based on at least partial agreement between the received ID information and the internal ID information, for instance, by using a wild card digit.

BRIEF DESCRIPTION OF THE DRAWINGS

Now the present invention is described in the following with reference to the appended drawings, in which:

FIG. 10 shows another signal format used in the invention; and,

FIG. 11 shows the meaning of the information fields for each of the signals illustrated in FIG. 8.

DETAILED DESCRIPTION OF THE PREFERRED EMBODIMENT

Figure 1:
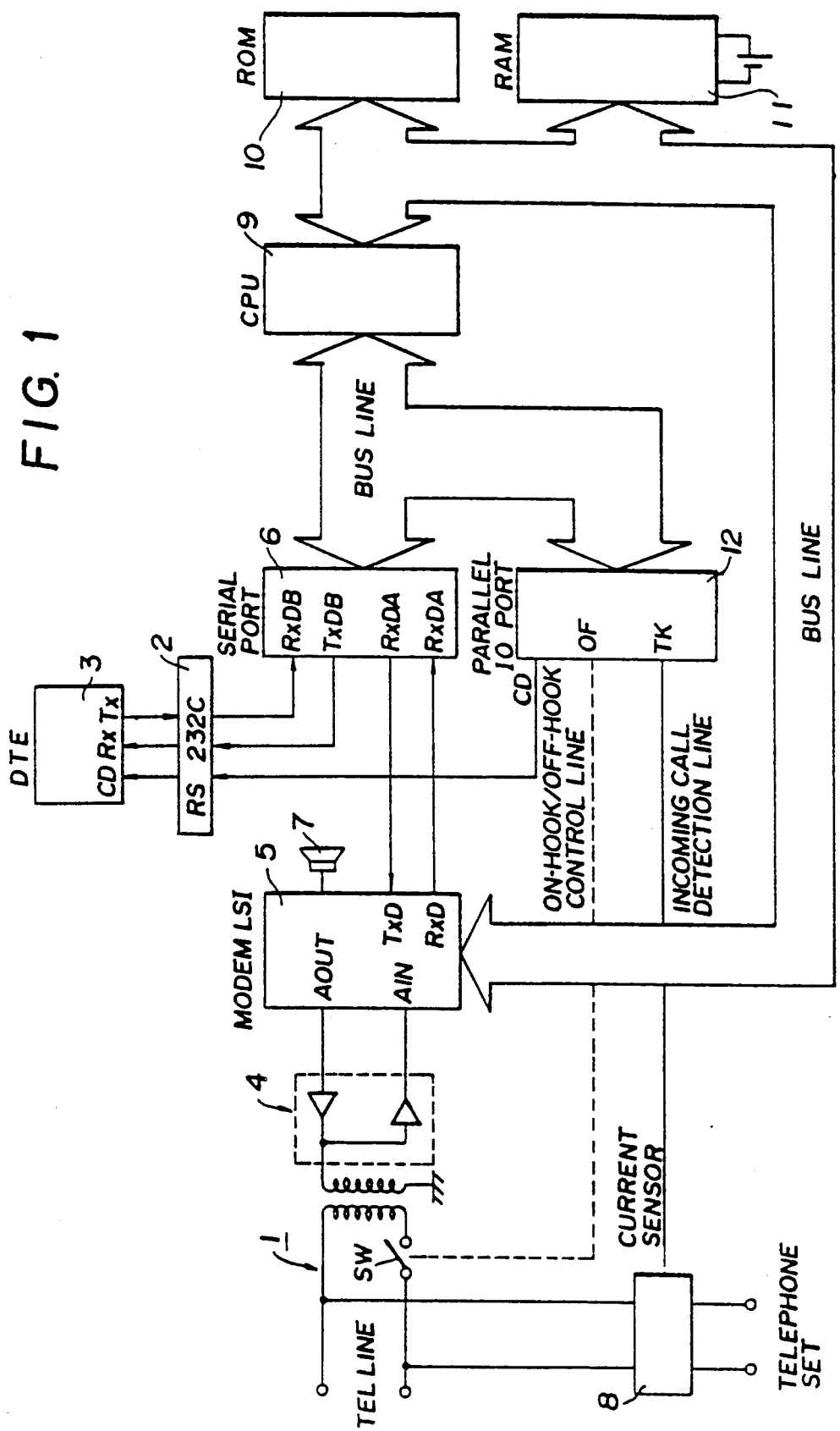
FIG. 1 is a block diagram of an embodiment of the intelligent modem system according to the present invention.

FIG. 1 is a block diagram illustrating the electric hardware structure of this modem system. This modem system is connected to a public communication line or the TEL line via a communication transformer 1, and to an information processing terminal (which is referred to as DTE hereinafter) 3, such as a mother computer, via an RS232C interface 2.

Between the communication transformer 1 and the RS232C interface 2 are provided a hybrid circuit 4, a modem LSI 5, and a full duplex serial IO port 6, in that order. The hybrid circuit 4 serves as a driver/receiver, and the modem LSI 5 is provided with various functions which can be selected by external control signals as well known. For instance, selection of a modulation system FSK (300), PSK (1,200) or QAM (2,400), selection of a communication speed 300 bps, 1,200 bps or 2,400 bps, adjustment of the volume level of an internal speaker, on-off control of the echoing of the transmitted data, on-off control of a monitor speaker 7, on-off control of the abort timer, etc. are possible with the modem LSI 5.

The overall operation of this modem system is controlled by a microcomputer which comprises a CPU 9, ROM 10 and RAM 11.

The serial IO port 6 is of a full duplex type, and is capable of switching over the modem LSI 5 between the DTE 3 (the transparent mode) and the CPU 9 (the command mode) as well as of performing serial/parallel conversion.

A telephone set can be connected to the TEL line via a current sensor 8 which forms a part of this intelligent modem system. The CPU 9 receives various commands from the DTE 3 via the serial port 6, and, via an OF terminal of a parallel IO port 12, on-off controls a switch SW for selectively connecting the modem system to the TEL line. The output of the current sensor 8 is supplied to the CPU 9 via a TK terminal of the parallel IO port 12 so that the CPU 9 can detect the use of the telephone set when a call is placed from this telephone set or an incoming call is received by the telephone set. The CPU 9 can further send out a CD signal to the DTE to indicate the start of data communication, via the parallel IO port 12.

Figure 2:
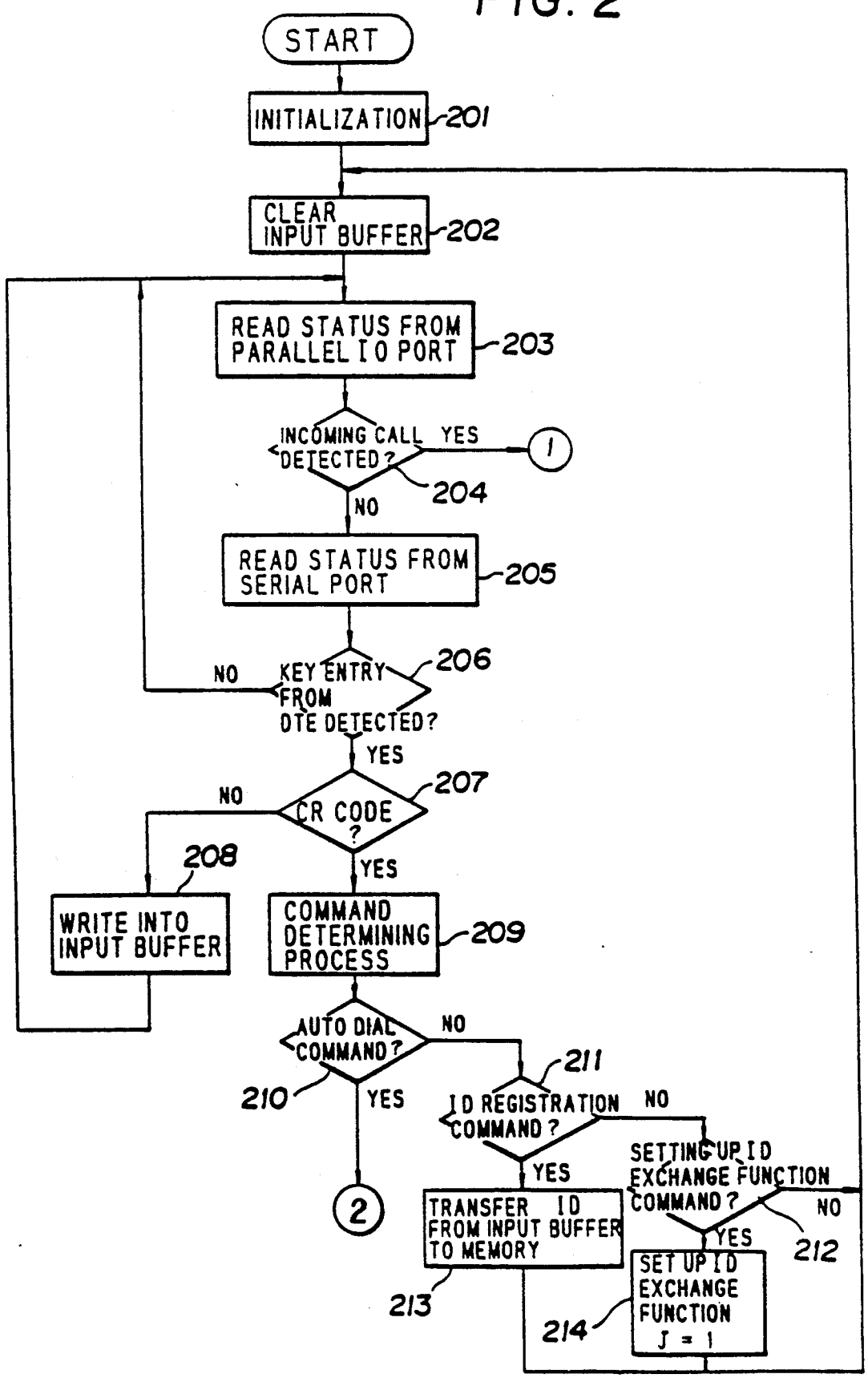
FIG. 2 is a flow chart of a part of the control program of the embodiment shown in FIG. 1 which is primarily related to the registration of ID numbers.
Figure 3:
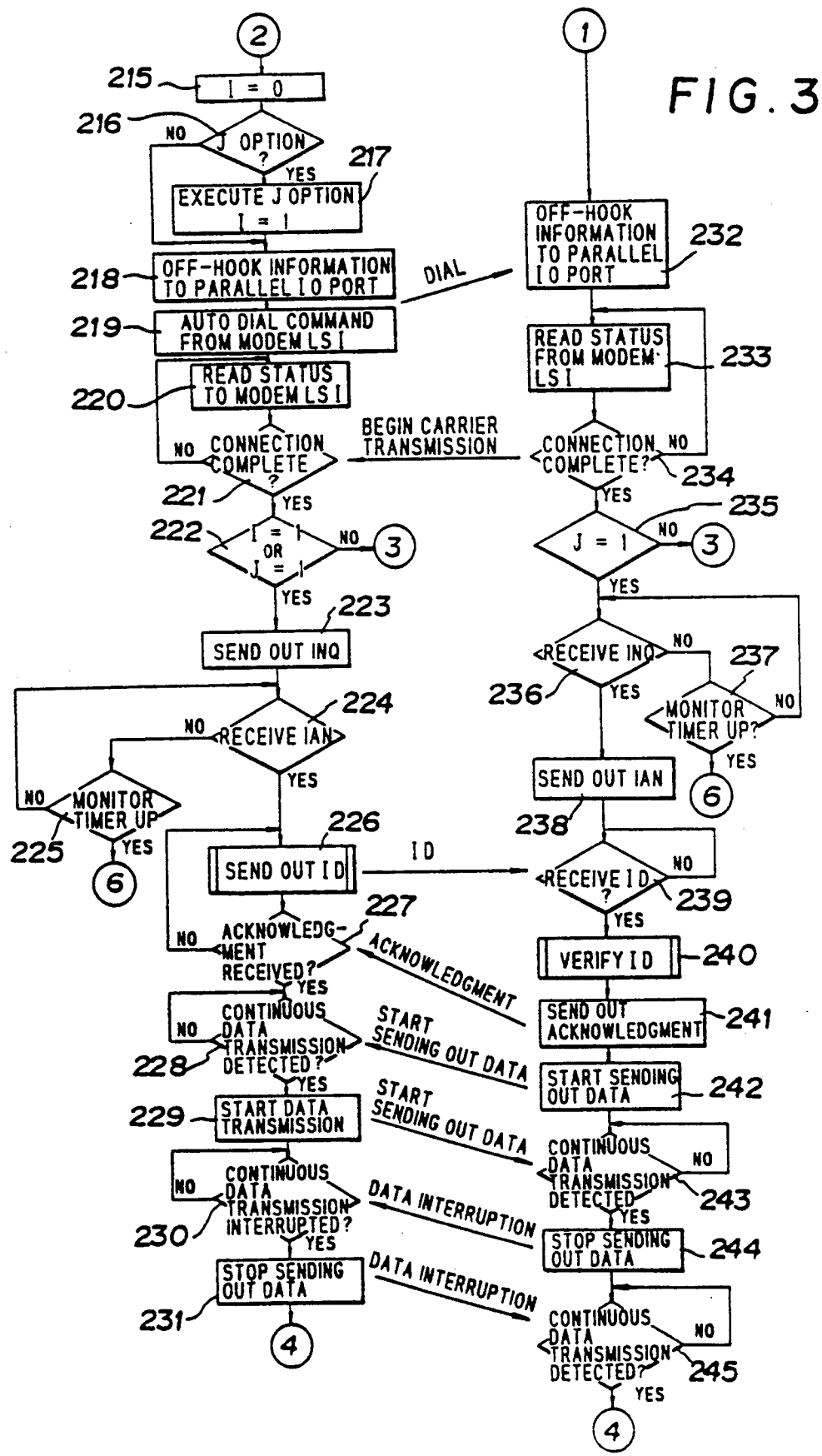
FIG. 3 is a flow chart of another part of the control program which is related to the protocol for the process of ID exchange.
Figure 4:
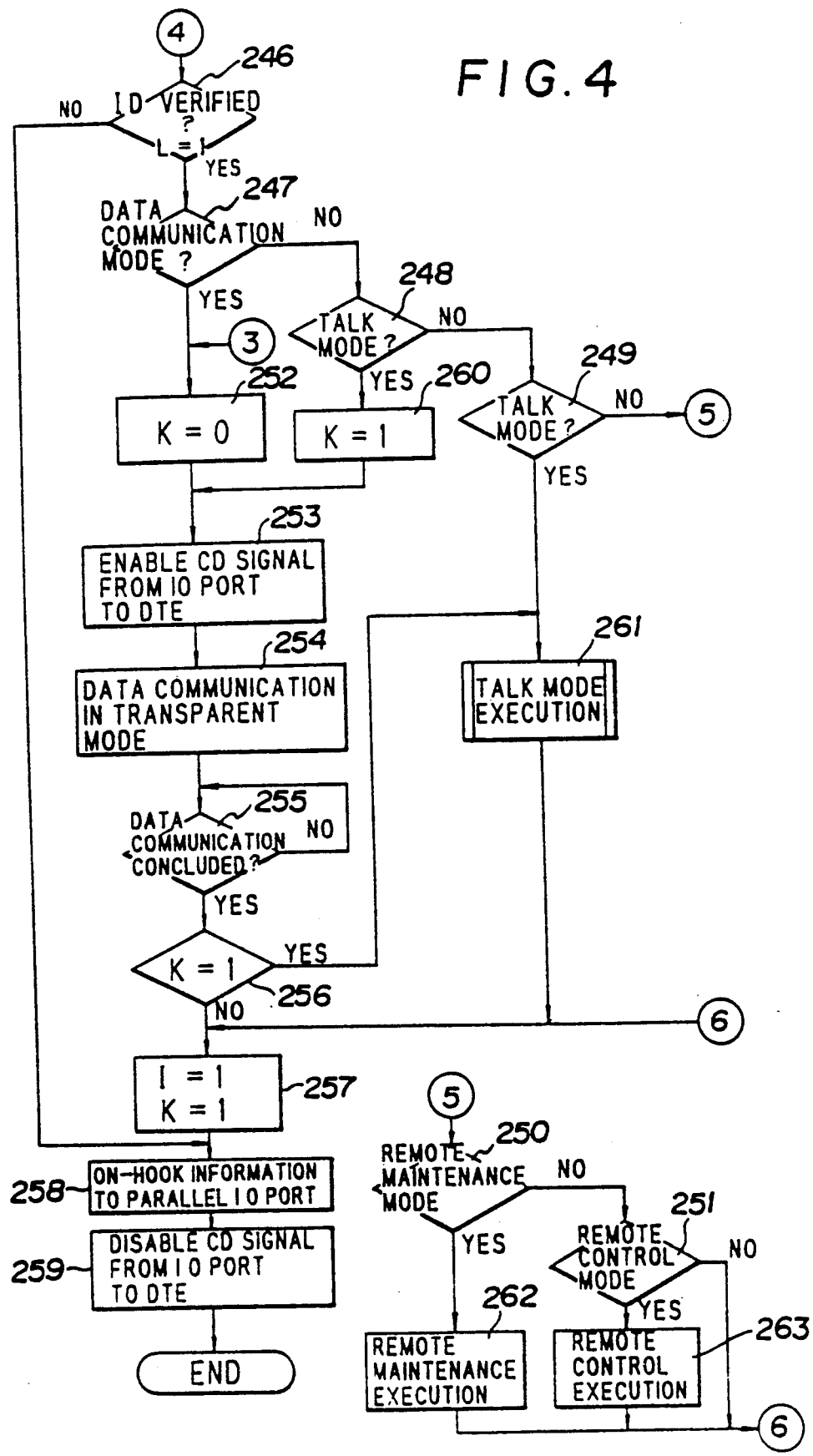
FIG. 4 is a flow chart of yet another part of the control program which is related to the change-over of the operation mode through a command character.

FIGS. 2 through 4 show a flow chart of the control program which is executed in the CPU 9. Now the operation of the present embodiment is described in the following with reference to this flow chart.

When the execution of the program is started, for instance, by turning on the supply of electric power to the modem system, various flags and registers are initialized in step 201, and the input buffer for storing the command from the DTE 3 is cleared in step 202. Thereafter, the system waits for the arrival of a call by monitoring the status of the parallel IO port 12 in steps 203 and 204, and key entries from the keyboard of the DTE 3 by monitoring the status of the serial port 6 in steps 205 and 206.

When any key entry from the keyboard of the DTE 3 is detected in this condition o when the determination result is "yes" in step 206, the data entered from the DTE 3 is sequentially written into the input buffer in step 208 until a CR code or a carriage return code is entered in step 207. When a CR code is detected in step 207, a command determination process is conducted in step 209 according to the data stored in the input buffer. Thereafter, it is determined whether the command entered from the DTE 3 is an auto dial command (ATD) "yyy ... y" in step 210, an ID registration command (ATJ) "xxxxxx" in step 211, or an ID exchange command (ATJ1) in step 212.

When an entry of the ID registration command (ATJ) "xxxxxx" is detected in step 211, the command character at the head of the entered string and the subsequent five ID digits are transferred to the designated areas of the RAM 11, which is provided with a back-up battery, in step 213. When an entry of the ID exchange command (ATJl) is detected in step 212, "1" is set to the flag J, which indicates the selection of the ID exchange function in step 214. In this way, according to the command from the DTE 3, a command character and five ID digits, and the flag J for the ID exchange function can be set up.

When the auto dial command (ATD) "yyy ... y" is transmitted from the DTE 3 in step 210 or an incoming call is detected via the parallel IO port 12 in step 204, the process of data transmission or data reception is executed, as the case may be, as given by the part of the flow chart of FIG. 3 where data exchange between two identical modem systems is considered.

First of all, the modem system acting as the sender sets its flag I for indicating whether the J option is being selected, to "0" in step 215. This J option is set up by a J option assign command (ATD) "yyy ... yJ", in the similar way as in step 212, to execute the ID exchange function for only once even when no ID exchange function has been set up. By this J option, it is possible to communicate with a conventional modem system not equipped with any ID exchange function without creating any compatibility problems as well as to execute an ID exchange sequence when the other party is equipped with a similar ID exchange function.

Figure 7:
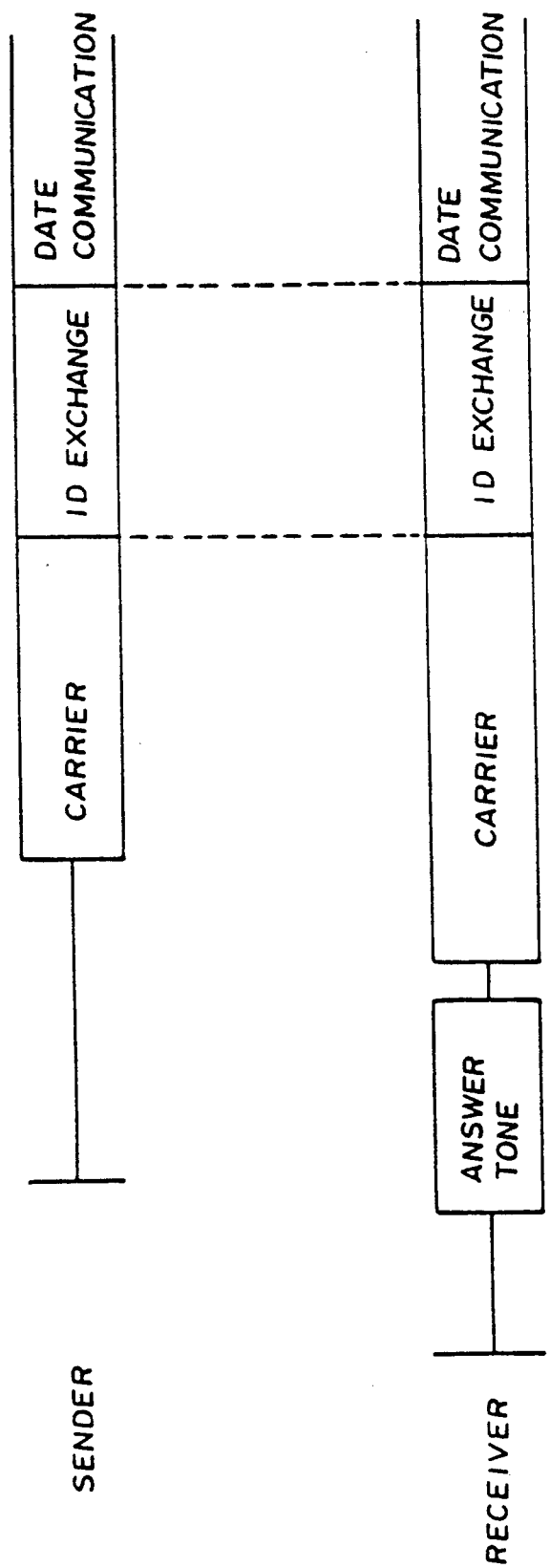
FIG. 7 shows a data format for information exchange.

Thus, when the J option assign command (ATD) "yyy ... yJ" is received from the DTE 3 in step 216, the flag I is set to "1" in step 217. Thereafter, the sender modem system turns on the switch SW by setting up off-hook information in the parallel IO port 12 in step 218, and feeds an auto dial command to the modem LSI 5 in step 219. Meanwhile, the receiver modem system sends out off-hook information to the parallel IO port 12 and thereby turns on the switch SW in step 232. As a consequence, an answer tone is produced from the modem LSI 5 and a carrier is transmitted thereafter as shown in FIG. 7. This in turn causes the receiver modem system to confirm the carrier from the sender modem system and returns a carrier to the sender modem system.

Once the two modem systems have sent carriers to each other, the two modems systems confirm the complete connection between them in steps 220 and 221 or steps 233 and 234, and, thereafter, the ID exchange routine is conducted in mutual synchronism as shown in FIG. 7.

Figure 8:
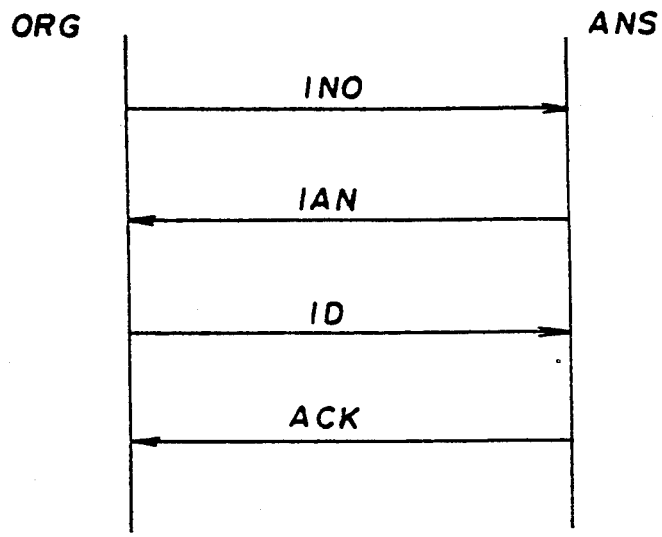
FIG. 8 shows how information fields are defined.

In an initial stage of the ID exchange sequence, as shown in FIG. 8, an inquiry INQ including a version number to identify the other party is sent from the sender ORG to the receiver ANS according to the data format given in FIG. 10 in step 223, and the sender waits for the arrival of a reply IAN including a version number from the receiver in step 224. The receiver modem system thus waits for the inquiry INQ including a version number from the sender in step 236, and, upon arrival of this inquiry INQ, returns a reply IAN including a version number to the sender in step 238. FIG. 11 illustrates the information field content for the signals used in the ID exchange sequence.

In this way, only when compatibility between the two systems is confirmed by the agreement of the version numbers, the sender sends out its ID number to the receiver in step 226. Therefore, according to the present embodiment, even when the receiver happens to be a conventional modem system which is not equipped with such an ID exchange function, the risk of the sender inadvertently sending out its ID to the receiver and thus disclosing its ID number to an unauthorized party can be positively prevented. When no IAN is returned within a certain prescribed time interval after an inquiry including a version number is made by the sender in step 223, a monitor timer runs out in step 225 and the TEL line is immediately disconnected from the modem system thereby preventing unnecessary line charges from being incurred. Likewise, if the receiver fails to receive an INQ including a version number within a prescribed time interval, its monitor timer runs out in steps 237 and the TEL line is immediately disconnected thereby preventing unnecessary line charges from being incurred. Such an automatic disconnect feature is effective in preventing an electronic bulletin board from being occupied by unauthorized parties and thereby limiting the availability of the service to authorized parties or legitimate subscribers.

If it is determined in step 222 or step 235 that an ID exchange is not necessary, the step of ID exchange is bypassed and the state of the system directly moves on to that for data communication. In this way, the modem system according to the present invention can communicate with conventional modem systems which are not equipped with any ID exchange function by omitting the ID exchange sequence.

Figure 5:
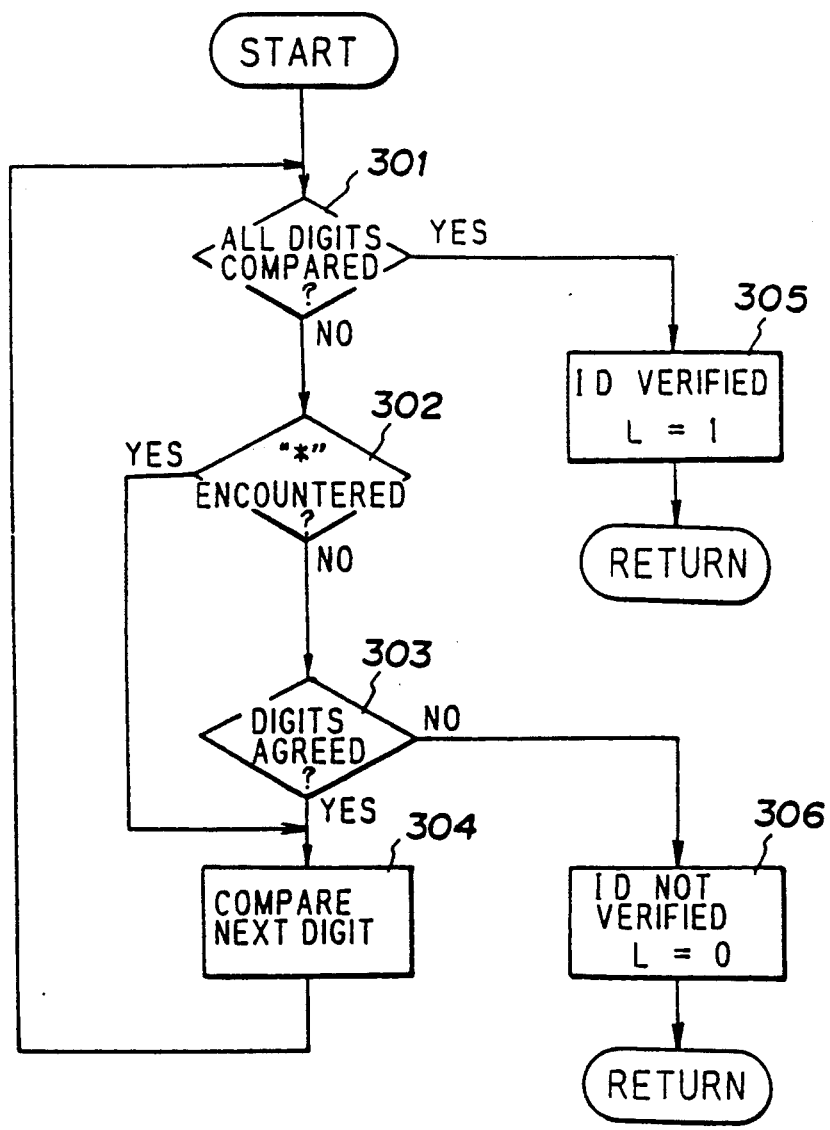
FIG. 5 is a flow chart of yet another part of the control program which is primarily related to the ID verification routine.

When the compatibility of the other modem system has been confirmed, the sender introduces itself to the receiver by sending out its ID number in step 226, and waits for the acknowledgment ACK from the receiver in step 227. After receiving the ID number of the sender in step 239, the receiver verifies that the sender is indeed an authorized party by matching the received ID number with an internal ID number in step 240. According to the present embodiment, the internal ID number may contain a wild card digit "*" in any one of the five digits it contains so as to create a certain tolerance on that particular digit. Thus, as shown in the part of the flow chart given in FIG. 5, in this ID number verification routine, each digit is verified either from the top most place or lower most place in sequential manner in steps 301, 302, 303 and 304. If any mismatch is detected during these verification steps in step 303, the flag L is reset to "0" as a case of mismatch and the ID number verification routine is concluded. However, when the wild card digit "*" is involved (step 302), there is no possibility of mismatch, and the system flow advances to the verification of the next digit. When all the digits have been verified in this way in step 301, the flag L is set to "1" as a case of successful ID number verification in step 305.

According to such an ID number verification routine, it is not necessary for all the subscribers to have a same ID number when a wild card digit is assigned to one or more digits in the internal ID number. For instance, when this system is applied to an electronic bulletin board system, the system can offer service to a large number of subscribers. Thus, since different ID numbers can be assigned to different subscribers, security may be ensured and, if desired, different services may be offered to different subscribers depending on their ID numbers.

When the ID number verification sequence has been concluded by the receiver modem system in step 240, it immediately sends back an acknowledgment signal to the sender modem system in step 241. On the other hand, the sender modem system, upon reception of acknowledgment signal ACK from the receiver modem system in step 227, waits for a prescribed string of data in step 228. After sending out the acknowledge signal in step 241, the receiver modem system starts sending out the prescribed string of data in step 242. This string may consist of characters arranged in a well define pattern such as 123123123 . . .

When such a string of data is received by the sender modem system in step 228, the sender modem system starts sending a similar well defined string of data in step 229. In the receiver modem system, after it has started sending out the string of data and has started receiving the similar string of data from the sender modem system in step 243, the receiver modem system discontinues the sending out of the string of data in step 244 and waits for the cessation of the transmission of the string of data from the sender modem system in step 245. In the sender modem system, upon detection of interruption of the string of data from the receiver modem system in step 230, the sender modem system immediately stops sending out the string of data, and proceeds to the state of data communication or to the transparent mode in synchronism thereto in step 231.

Meanwhile, in the receiver modem system, upon detection of the cessation of the string of data from the sender modem system in step 245, the receiver modem system likewise immediately stops sending out the string of data and proceeds to the state of data communication or to the transparent mode in synchronism thereto.

In this way, by carrying out the protocol in steps 218 through 231 or steps 232 through 245, the sender and receiver modem systems can substantially simultaneously proceed to the state of data communication as shown in FIG. 7, and the possibility of revealing any ID information due to any large shifting between the two parties in the timing of entering the state of data communication can be positively prevented.

Figure 9:
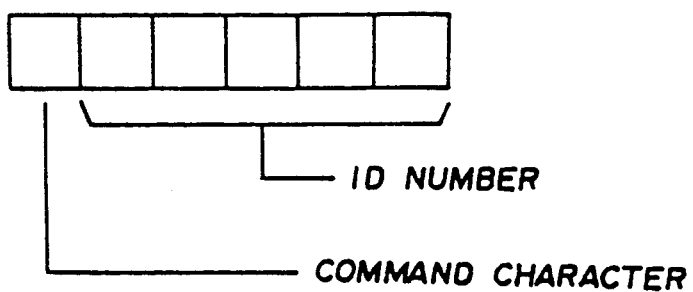
FIG. 9 shows a signal format used in the invention.

In this way, when synchronism has been established between the two parties, according to the present embodiment, prior to the transition to the transparent mode for data communication, the system may start operating in one of a number of modes of operation depending on the state of the ID agreement flag L and the content of the command character shown in FIG. 9.

In other words, as shown in FIG. 4, when a disagreement is detected between the ID numbers in step 246, on-hook information is immediately sent to the parallel IO port 12 in step 258. As a result, the switch SW is turned off to disconnect the modem system from the TEL line, and a CD signal is produced from the parallel IO port 12, whereby the DTE 3 can detect the disabling of data communication.

On the other hand, when a complete agreement between the ID numbers is detected in step 246, depending on the content of the command character (FIG. 9), it is determined whether the data communication mode (command character I), the talk mode subsequent to data communication (command character T), the talk mode (command character S), the remote maintenance mode (command character M) or the remote control mode (command character R) is being selected in steps 247, 248, 249, 250 and 251.

When the data communication mode is determined to be the case in step 247, the flag K for the talk mode subsequent to data communication is reset to "0" in step 252, and a CD on signal is transmitted to the DTE 3 via the parallel IO port 12 in step 253. At this point, permission to start data communication is notified.

According to the CD signal, the DTE 3 can determine whether data communication may be started or not, and the serial port 6 accomplishes the switch over between the DTE 3 and the modem LSI 5 to achieve the transparent mode. Thereafter, the data sent form the DTE 3 is sent to the modem LSI 5 via the serial port 6, and is ultimately transmitted to the TEL line. Meanwhile, the data arriving from the TEL line can reach the DTE 3 via the serial port 6 in step 254.

The CPU 9 then waits for the conclusion of data communication in step 255. If conclusion of data transmission is confirmed in step 255, provided that the flag K is not "1" in step 256, the flags I and K are set to "0" in step 257, on-hook information is sent to the parallel IO port to turn off the switch SW in step 258, and CD signal off information is sent to the parallel to IO port in step 259, to notify the DTE 3 the conclusion of data transmission in step 259.

On the other hand, the talk mode subsequent to data communication is determined from the content of the command character in step 248, the flag K is set to "1" in step 260. Thereafter, the sequence from the sending out of the CD signal and the confirmation of the conclusion of data communication is performed in steps 253 through 255, and, upon confirming of the conclusion of data communication in step 255, since the flag K is determined to be "1" in step 256, the talk mode is produced in step 261.

Figure 6:
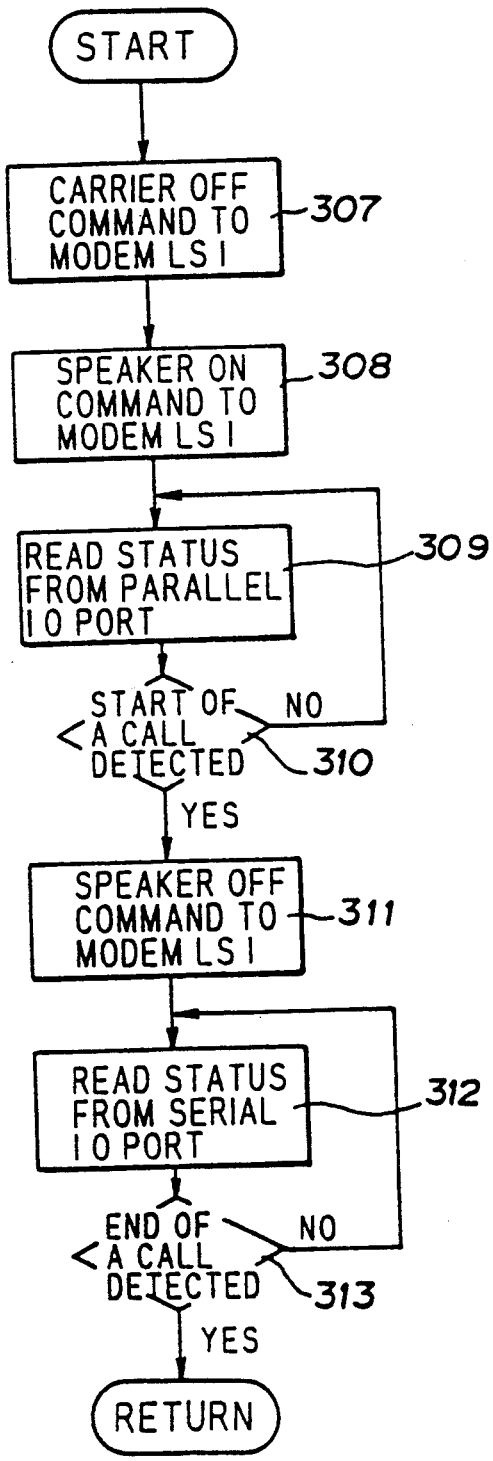
FIG. 6 is a time chart illustrating the timing of data transmission and reception preceding the onset of the state of data transmission.

In this talk mode, as shown in FIG. 6, a carrier off signal is given to the modem LSI in step 307, and a monitor speaker on signal is supplied to the modem LSI in step 308.

Thereafter, the status of the parallel IO port is read out in step 309, and the system waits for the start of the telephone communication while monitoring the output from the current sensor 8 in step 310. Upon detection of the start of telephone communication in step 310, a monitor speaker off signal is supplied to the modem LSI in step 311. Then, the conclusion of telephone communication is detected in step 313 according to the status of the serial IO port in step 312, and the talk mode processing routine is concluded upon detection of telephone communication in step 313.

Thereafter, the steps 257 through 259 are executed, and the execution of the control program is concluded.

When the remote maintenance mode (step 250) or the remote control mode (step 251) is determined according to the content of the command character, the remote maintenance routine (step 262) or the remote control routine (step 263) is executed as the case may be, in well known fashion in either case. Thus, it is made possible to perform remote maintenance of the modem system of the other end or to control external equipment via a microcomputer or the like which is connected to the modem system of the other end.

Thus, by using the intelligent modem system of the present invention in both the sender and the receiver, the verification of the other parties can be performed at high speed without any burden on the information processing terminals such as microcomputers associated with the modem systems. Therefore, the communication software may not be provided with any verification routine, and the information processing terminals such as microcomputers are not all distracted by unauthorized attempts to get access to the modem system.

In the above embodiment, the ID number was transmitted from the sender to the receiver, but it is equally possible for the ID number to be transmitted from the receiver to the sender, or to be exchanged between the sender and the receiver. Likewise, although in the above embodiment, the exchange of an ID number was performed both upon reception and transmission of data, but the ID exchange may be performed only upon receipt of data if the user is interested only in eliminating the inconveniences which may arise due to unauthorized attempts to get access to the modem system.

What we claim is:

1. An intelligent modem system for connection between an information processing terminal and a public communication line comprising:

means for storing at least an identification code in said modem system;

means for providing a detection signal when an incoming call from a calling remote party is detected on said communication line;

a modem circuit for modulating data sent to said communication line and demodulating data received from said communication line; and reception operation control means for verifying during a connection period when a calling remote party is communicating with said modem system over said public communication line that said remote party is authorized to communication with said information processing terminal and comprising:

means responsive to said detection signal for answering an incoming call on said communication line and for operating said modem circuit to establish a data communication connection with said calling remote party;

means operative after said data communications connection is established and during said connection period for verifying that an identification code received from said calling remote party bears a correspondence to said stored identification code;

means for starting a continuous transmission of data to said calling remote party after said identification code has been verified;

means for discontinuing said continuous transmission of data upon receiving a continuous transmission of data from said calling remote party; and means for connecting said information processing terminal with said modem circuit during said connection period to enable communications between said terminal and said calling remote party through said modem circuit only when said received identification code is verified and said continuous transmission of data has been discontinued by said means for discontinuing said continuous transmission of data.

2. An intelligent modem system as in claim 1 further comprising transmission operation control means for self-introducing said modem system to a called remote party, said transmission operation control means comprising:

means for connecting said modem circuit to said communication line;

means for initiating a call to said called remote party over said communication line;

means for sending said identification code to said called remote party; and means for connecting said information processing terminal to said modem circuit to enable communications between said terminal and said called remote party through said modem circuit only upon receiving permission to do so from said called remote party.

3. An intelligent modem system as in claim 2 wherein said transmission operation control means further comprises:

means for determining if said called remote party has been designated as having means to identify said called remote party; and means permitting said self-introduction by said transmission operation control means only when said called remote party is equipped with means to identify it.

4. An intelligent modem system as in claim 1, further comprising means to disconnect said modem system from said public communication line when said calling remote party is not an authorized party.

5. An intelligent modem system as defined in claim 2, wherein said reception operation control means further comprises:

a) means for sending out a carrier to said calling remote party after connection of said modem system to said public communication line in response to the presence of said detection signal;

b) means for receiving said identification code transmitted from said calling remote party;

c) means for comparing said received identification code with said stored identification code;

d) means for starting a continuous transmission of data to said calling remote party when said received identification code agrees with said stored identification code;

e) means for connecting said modem circuit connected with said public communication line to a line leading to said information processing terminal in synchronism with an interruption of a continuous transmission of data from said calling remote party; and f) means for notifying said information processing terminal of the completion of said connection of said modem circuit with said information processing terminal, and wherein said transmission operation control means further comprises:

g) means for waiting for a transmission of a carrier from said called remote party after connection of said modem system to said public communication line for data transmission;

h) means for transmitting a carrier and said identification code to said called remote party upon reception of said carrier transmitted from said called remote party;

i) means for starting a continuous transmission of data upon reception of a continuous transmission of data from said called remote party;

j) means for discontinuing said continuous transmission of data, and for connecting said modem circuit connected to said public communication line to a line leading to said information processing terminal; and k) means for notifying said information processing terminal of the completion of said connection of said modem circuit with said information processing terminal.

6. An intelligent modem system as in claim 2, wherein said storing means is adapted for storing operation mode designating information as well as said identification code, and said modem system is provided with an operation mode which corresponds to said operation mode designating information.

7. An intelligent modem system as in claim 6, wherein said operation mode designating information designates whether said called remote party communicating with said modem system over said public communication line is required to be identified or not before connecting said modem circuit connected to said public communication line to a line leading to said information processing terminal.

8. An intelligent modem system as in claim 6, wherein said storing means is adapted for storing operation mode designating information as well as said identification code, and said modem system is provided with an operation mode which corresponds to said operation mode designating information, and wherein said operation mode designating information designates whether said self-introduction is to be made or not before connecting said modem circuit connected to said public communication line to a line leading to said information processing terminal.

9. An intelligent modem system as in claim 8, wherein said operation mode designating information causes said self-introduction operation only upon occurrence of a first transmission operation in association with setting up of said operation mode designating information, but causes said information processing terminal to be connected to said modem circuit without said self-introduction operation for a second transmission operation.

10. An intelligent modem system as in claim 6, wherein said operation mode designating information designates a telephone communication mode based on the use of a telephone set without designating a data communication mode based on the use of said information processing terminal after said calling remote party is identified to be an authorized party.

11. An intelligent modem system as in claim 6, wherein said operation mode designating information designates a transition to a telephone communication mode based on the use of a telephone set immediately after conclusion of data communications with said information processing terminal.

12. An intelligent modem system as in claim 6, wherein said operation mode designating information designates a transition to a remote maintenance mode without designating a data communication mode based on the use of said information processing terminal after said remote party is identified to be an authorized party.

13. An intelligent modem system as in claim 6, wherein said operation mode designating information designates a remote control mode without designating a data communication mode based on the use of said information processing terminal after said calling remote party is identified to be an authorized party.

14. An intelligent modem system as in claim 1, wherein said verification of said identification code is based on at least partial agreement between said received identification code and said stored identification code.

* * * * *